Figure 1:
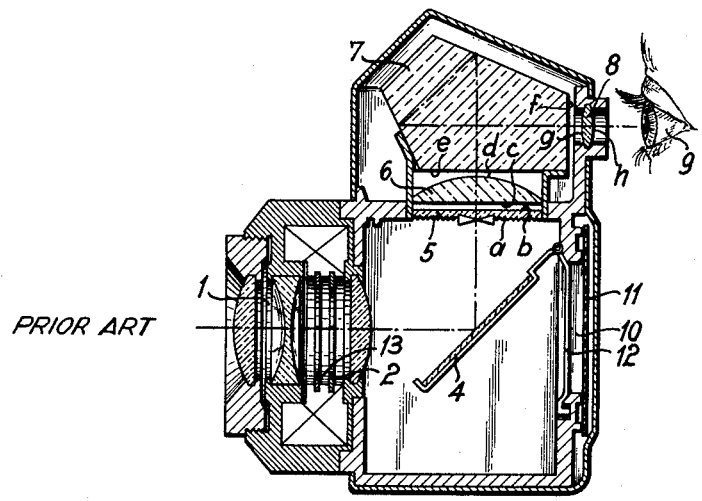

Sept. 4, 1962    F. PAPKE    3,052,169
VIEWFINDER FOR SINGLE LENS REFLEX CAMERAS
Filed Dec. 9, 1960

INVENTOR
Friedrich Papke
By Blum, Moravitz, Friedman + Blum
Attorneys

United States Patent Office 3,052,169
Patented Sept. 4, 1962

3,052,169
VIEWFINDER FOR SINGLE LENS
REFLEX CAMERAS
Friedrich Papke, Braunschweig, Germany, assignor to Voigtlander A.G., Braunschweig, Germany, a corporation of Germany
Filed Dec. 9, 1960, Ser. No. 75,000
Claims priority, application Germany Dec. 14, 1959
10 Claims. (Cl. 95—42)

This invention relates to single lens reflex cameras and, more particularly, to an improved viewfinder arrangement for such cameras.

Cameras of this general type are well known. They include an objective lens system and a hinged reflector movable into and out of the path of light rays entering through the objective. In the view-finding position, this hinged reflector directs light rays passing through the lens system to a ground glass screen on which an image is formed. Beyond this screen, in the path of the light rays, there is arranged an image erecting and inverting roof-prism whereby an erected image of the view is provided at the eye-piece, this eye-piece being arranged to be held at eye level. In the picture taking position, the reflecting device is moved out of the path of light rays entering through the objective so that these light rays, under the control of a diaphragm aperture adjusting means and of a shutter, may impinge directly upon the sensitive material or film disposed at substantially right angles to the optical axis of the objective lens system.

It is also rather common to provide such reflex cameras with a central shutter, or a shutter of a similar type, in place of the slot type shutter which formerly had been used exclusively. The slot type shutter is usually positioned behind the objective lens in the direction of entering light rays.

The incorporation of hinged reflector means in such a camera presents many difficult problems, largely due to the fact that it is an element in the path of the light rays entering through the objective lens and passing to the eye-piece, and an element which is of great importance in properly focusing the objective lens. Such focusing is accomplished by viewing the image, appearing on the ground glass screen, through the eye-piece. For these reasons, close tolerances are necessary in the calibration and operation of the reflecting device. Furthermore, as the reflecting device is a relatively heavy or massive member, it presents design problems from the standpoint of kinematics and dynamics.

The proper fitting of the hinged reflecting device into the camera also presents difficulties in providing that, in its movement, there will be no interference with the objective lens. In the case of reflex cameras utilizing a central shutter, a light flap must be provided in addition to the hinged reflector to protect the film from exposure when the reflector is in the view-finding position. At that time, the shutter is open and the hinged reflector is in an oblique position for the purpose of reflecting the light rays received through the objective lens to the ground glass screen.

A known way of avoiding the problems encountered in using a swingably or hingedly mounted reflector, is to use a reflector that is partially permeable and fixed in position, the partially permeable reflector being preferably mounted within a block of transparent material such as glass or the like. In known reflectors of this type, the light rays directed to the film, as well as the light rays directed to the eye-piece, are noticeably diminished in intensity. Within the skill of the art, this loss of light intensity can be reduced to limits making this type of reflector useable in many applications, and thus still permit the use of such partly permeable reflectors, when considered from the standpoint that the advantages provided by this type of design outweigh other disadvantages, such as those of an optical nature, for example. A very appreciable reduction of the loss of light intensity can be provided, for example, by treatment of the faces of the prism in a known manner, such as by vapor deposition of layers of material having a reflection lowering effect. Another expedient is the use of non-light-absorbing means for splitting the reflector to provide the partially light permeable effect, the splitting usually being of a nature to afford a ratio of about 40:60 or 30:70, wherein the smaller number represents the amount of reflected light.

However, even when such expedients are utilized, high quality reflex cameras provided with partially light permeable reflectors have not proven satisfactory hitherto. The image appearing in the eye-piece is particularly deficient from the standpoint of brightness, clarity and contrast, which is a marked disadvantage in the use of mixed image range finders which are frequently employed in modern cameras. In such cases, the mixed images are very poorly identifiable.

The present invention is directed to a partially light permeable reflector for use in reflex cameras in which the aforementioned disadvantages are, for all practical purposes, eliminated. The view-finder arrangement of the present invention utilizes a partially permeable reflector which is preferably mounted within an Abbe hexahedron, and the above-mentioned means are provided to reduce the light losses to the lowest possible minimum.

More importantly, in accordance with the present invention, the individual components of the view-finder and its image erecting and inverting system are designed and interrelated so as to form a single integral structure unit, in which the individual members, including the terminal eye-piece, are cemented to each other by transparent cement. By providing such an integral structural unit in which the several elements are united in face to face relation by transparent cement, the light losses due to reflection at air interfaces are eliminated. While the design of a view-finder in accordance with the invention is described as applied to a reflex camera having a central shutter, it should be mentioned that exactly the same type of arrangement may be used with a reflex camera of various constructions, and will have particularly advantageous effects when used with a reflex camera having a slot type shutter.

For an understanding of the principles of the invention, reference is made to the following description of a typical embodiment thereof as illustrated in the accompanying drawing.

Figure 2:
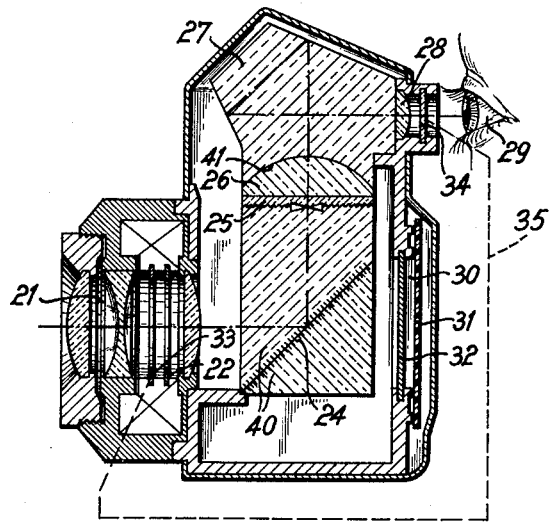

In the drawing:

FIG. 1 is a vertical sectional view through a reflex camera illustrating a known arrangement of hinged reflection device in the viewfinder system; and FIG. 2 is a similar view through a typical reflex camera incorporating a viewfinder arrangement embodying the present invention.

Referring to FIG. 1, which illustrates the prior art, an objective lens 1 provided with a diaphragm 2 directs incoming light rays onto a reflector 4 which directs these rays onto a ground glass screen 5. Such reflection of the rays by the reflector 4 occurs when the reflector is in the position shown in FIG. 1 and when the shutter 13 is open. The image appearing on ground glass screen 5 is directed by a field lens 6, through a roof-prism 7 and an eye-piece 8, to the eye 9 of the viewer. The film 11, or other photosensitive material, is positioned behind the image window 10, and a flap 12, movable with the reflector 4, protects the film against incident light when the reflector 4 is in the viewfinding pisition with the shutter 13 open.

In the camera shown in FIG. 2, which represents one embodiment of the invention, the same optical components perform the same functions in the same manner, and are arranged in the same sequence as shown in FIG. 1. However, as distinct from the arrangement in conventional cameras as shown in FIG 1 wherein the several components are separated from each other so that they exhibit glass-air interfaces, in the arrangement shown in FIG. 2, and embodying the present invention, the entire viewfinder assembly is combined to form a single complete, closed, and integral structural unit by virtue of joining of individual parts into a single block through the use of transparent optical cement.

Referring to FIG. 2, when shutter 33 is open, objective lens 21, provided with the aperture controlling diaphragm 22, directs the light rays from the subject to the partially permeable mirror 24 which, in turn, reflects light rays onto the ground glass screen 25. The partially light permeable mirror 24 is positioned on the hypotenuse face of a divided, but cemented, glass unit 40 to which is permanently cemented the ground glass screen 25. The field lens 26, which may comprise hightly brittle glass, has its plane face cemented to the ground glass screen 25 and its convex face cemented into a mating concave face 41 of a penta-prism 27. The ocular lens 28 is similarly cemented to the penta-prism 27, and the eye of the viewer is indicated at 29.

Light passing directly through the partially permeable reflector 24, and not reflected thereby, is intercepted by a flap 32 which screens the image window 30 so that it will not impinge directly on the film or other photosensitive material 31 unless the flap 32 is open. As in the example of the prior art shown in FIG. 1, a central shutter 33 is provided within the objective 21 and functions in the same manner as in the case of standard single lens reflex cameras. Preferably, shutter 33 is coupled with diaphragm aperture control 22.

From a comparison of FIGS. 1 and 2, it will be noted that there is no essential difference insofar as the path of travel of the light rays is concerned. However, there is a substantial difference in the fact that, in the arrangement fo FIG. 1, a full reflector is positioned in the path of light rays directed to the eye-piece 8. In comparison, in FIG. 2, a partially permeable reflector is arranged, in a known manner, in the path of light rays directed to the eye-piece 28. The outstanding advantages from the point of conservation of light will be best appreciated by the following comparison of the two arrangements.

When a photograph is actually taken with the camera shown in FIG. 1, the hinged reflector 4 is swung out of the path of the light rays so that the light will strike the film 11 with full intensity. On the other hand, in the arrangement shown in FIG. 2, the intensity of the light striking the film 31 will be diminished in accordance with the ratio of the division of light by the reflector 24. If the commonly adapted ratio of 50 percent reflection to 50 percent transmission of the reflector is not utilized, but a ratio is utilized which is higher on the side of transmission, one is able to obtain film exposures that are tolerable and practical in photography. If, by way of example, a reflector light division ratio of 40:60 is adopted, the light passing through the reflector and thus incident upon the film will be diminished in intensity by 40 percent. However, this has a lesser effect upon the exposure than might be assumed, since it represents a drop in luminous intensity of about one-half (½) a diaphragm step on the usual diaphragm scale. This drop in intensity is of even lesser significance in terms oft he sensitivity scale. Thus, for example, it comes to less than one-half a degree lower in terms of the German DIN-sensitivity scale. As may be adequately demonstrated in practice, such a drop in light intensity does not exert any disadvantageous effect whatsoever in the greatly predominant number of instances encountered in practice. It is only where extreme light ratios prevail that this deficiency of one-half a degree could have a disadvantageous effect. However, even in these instances, the disadvantage may be eliminated by suitable correction of the diaphragm opening or the shutter time setting.

Thus, it will be clear that the use of a ray divider or partially permeable reflector in the path of the light rays is fully practical insofar as exposure of the film is concerned. However, it was just the aforementioned and necessarily appreciable drop of intensity in the light passing to the eye-piece that rendered the use of such a partially permeable reflection practical in the case of known single lens reflex cameras, due to the fact that the image appearing in the viewfinder was too faintly illuminated. Thus, as regards the prior art use of a partially permeable reflector in the path of light rays directed to the viewfinder, as compared to the present invention, the following comparison is of importance.

In the arrangement shown in FIG. 1, the light directed to the eye-piece 8 is reflected by the fully mirror-coated and obliquely mounted hinged reflector 4. Generally, reflectors of this type exhibit a ten percent loss of light, and sometimes even a greater loss. However, it may be assumed that about 90 percent of the incident light is reflected under favorable conditions. This reflected light, in the arrangement of FIG. 1, then is directed uniformly through a plurality of glass-air interfaces. In the particular case shown in FIG. 1, there are eight such glass-air interfaces labeled a, b, c, d, e, f, g, and h, for the four consecutive optical members 5, 6, 7, and 8. As can be demonstrated in practice, no less than five percent of the incident light is lost on each of these interfaces a through h by reflection, thus resulting in a total of 25 percent loss of light due to these glass-air interfaces. If there is added to this 25 percent loss at the glass-air interfaces the light lost on the reflector 4, the total loss in intensity of light reaching the eye-piece 8 ranges from 35 percent to 40 percent. Thereby, only about 60 percent of the light leaving the objective lens reaches the eye of the viewer. Experience has shown that the brightness of the image appearing to the eye of an observer, in the viewfinder, is completely adequate and that the viewer finds the viewfinder image to be bright and well defined in the case of an arrangement shown in FIG. 1.

Turning now to the arrangement shown in FIG. 2, when all of the optical members in the path of the light ray leaving the objective lens 21 and emerging through the eye-piece 34 are combined into a single unit, there is no loss in light intensity following the partially permeable light divider 24. Assuming the mentioned preferred ratio of division of the reflector 24, there is reflected 40 percent of the light incident thereon. All of this light reflected by the reflector 24 reaches the eye of the observer, as there is no light lost between the reflector 24 and the outer surface of the ocular member 28. As compared with the amount of light reaching the eye of the viewer in the arrangement shown in FIG. 1, the amount reaching the eye of a viewer in the arrangement shown in FIG. 2 is decreased in the ratio of 2:3. Thus, the degree of brightness is theoretically reduced by about 30 percent in terms of light intensity. As a practical matter, the diminishing of the light intensity is such a small amount that it is not apparent to the observer.

From the foregoing, it will be noted that the great advantages resulting from the viewfinder design as shown in FIG. 2, and prominent among which is the elimination of the hinged reflector 4 of FIG. 1, are counterbalanced by adverse features which, as effects the light balance, are of an insignificant nature.

In the case of reflex cameras provided with hinged reflectors, such as shown in FIG. 1, the light reflecting properties of the hinged reflector prevent intrusion of light from the eye-piece when an exposure is made. With the elimination of such a protective device, as in the case of arrangement employing partially permeable mirrors as shown in FIG. 2, for example, there is no protection against light reaching the film from the eye-piece of the viewfinder. It is therefore advisable to provide a light shielding device 34 so connected to the shutter of the camera that it blocks off light entering the camera along the path of the rays to the eye-piece, at least at the instant of exposure. The shutter 33 and the light shielding device 34 can be operatively connected for simultaneous actuation by any suitable mechanical expedient, as indicated by the broken line 35, in FIG. 2, interconnecting the elements 33 and 34.

It should be noted, for example, that the ground glass screen 25 can be advantageously replaced by a dispersion screen devised in the form of a stepped lens, as this exhibits only a slight and very limited light dispersion as compared to that of a ground glass screen. Using such a dispersion screen, it would be possible, in many instances, to dispense with the shielding device 34 arranged between eye-piece 28 and the eye 29.

While specific embodiments of the invention have been shown and described in detail to illustrate the application of the principles of the invention, it will be understood that the invention may be embodied otherwise without departing from such principles.

What is claimed is:

1. In a single lens reflex photographic camera of the type incorporating a viewfinder in which light rays entering through an objective lens system are reflected by a reflecting device, including a partially light-permeable reflecting surface in a plane extending obliquely across the extended optical axis of said objective lens system, to a screen to form an image of the view, and including an eye-piece lens and image erecting and inverting optical means disposed in the path of light rays between said screen and said eye-peice lens; the improvement comprising a solid integral structural member of transparent material extending between and including the reflecting surface and the eye-piece lens and having the screen and the optical means incorporated therewith; whereby there are no air-transparent material interfaces between the reflecting surface and the outer surface of the eye-piece lens.

2. The improvement defined in claim 1 in which said partially light-permeable reflecting surface is incorporated in a block of transparent material which is cemented to said solid integral structural member.

3. The improvement defined in claim 2 in which said block, said screen, said optical means, and said eye-piece are cemented together to form said solid integral structural member.

4. The improvement claimed in claim 2 in which said block of transparent material comprises a pair of units having mating oblique surfaces cemented together and providing said partially light-permeable reflecting surface, said block of transparent material being mounted inwardly of said objective lens; said screen being cemented to an end face of said block; said optical means including a field lens cemented to said screen and a penta-prism with a roof-face cemented to said field lens; said prism having an end face turned toward the eye of the viewer and having said eye-piece lens cemented thereto.

5. The improvement defined in claim 1 in which the camera has an image window extending across the optical axis of the objective lens system in advance of the film, and a light shielding flap mounted in front of the image window and positioned in the path of light rays thereto except during the taking of an exposure; a light screening device positioned adjacent the outer face of the eye-piece lens; said light screening device being coupled with the camera shutter and being movable into light obstructing relation with the eye-piece lens upon operation of the camera shutter in making an exposure.

6. The improvement defined in claim 1 in which said screen comprises a ground glass screen.

7. The improvement defined in claim 1 in which the screen comprises a light dispersion screen in the form of a stepped lens having very slight and strictly limited dispersion.

8. The improvement defined in claim 2 in which said block of transparent material extends substantially normal to the optical axis of the objective lens system and has an end face, in such normal direction, cemented to said screen.

9. The improvement defined in claim 4 in which said field lens has a plane face cemented to said screen and a convex surface cemented into a mating concave recess in said penta-prism.

10. The improvement defined in claim 1 in which the characteristics of said partially light-permeable reflecting surface are such that it reflects approximately 40 percent of the light incident thereon and transmits therethrough approximately 60 percent of the light incident thereon.

References Cited in the file of this patent
UNITED STATES PATENTS
2,968,228     Merritt _____ Jan. 17, 1961